United States Patent [19]

Schull

[11] 4,169,687

[45] Oct. 2, 1979

[54] LOCK FOR EXTENDABLE LEG ASSEMBLY

[76] Inventor: George R. Schull, 6778 Eddinghill Dr., Rancho Palos Verdes, Calif. 90274

[21] Appl. No.: 932,947

[22] Filed: Aug. 11, 1978

[51] Int. Cl.² ............................................. F16B 7/10
[52] U.S. Cl. .................... 403/109; 403/342; 403/341; 248/410
[58] Field of Search ............... 403/109, 341, 342, 350, 403/104; 285/340; 248/125, 354 C, 355, 295 C, 245, 410

[56] References Cited

U.S. PATENT DOCUMENTS

| | | | |
|---|---|---|---|
| 2,664,259 | 12/1953 | Rose | 403/109 X |
| 2,703,690 | 3/1955 | Petrick et al. | 403/109 X |
| 3,596,946 | 8/1971 | Burton | 403/109 |
| 3,737,136 | 6/1973 | Snurr | 403/109 X |

FOREIGN PATENT DOCUMENTS 2300539  7/1974  Fed. Rep. of Germany .......... 403/104

Primary Examiner—Wayne L. Shedd

[57] ABSTRACT

A lock for an extendable leg assembly including a sleeve coaxially receiving an end of an outer leg member and an inner leg member as it telescopes into the outer leg. The sleeve is hand-turnable between first and second rotational positions. In the first rotational position, the central axis of a ring turnable with and within the sleeve is coaxial with the leg members and a side face of the ring is flush with an inclined end face of the outer leg. In that position, the inner leg member is free to move into or out of the outer leg. In the second rotational position, the ring is turned such that its central axis forms an acute angle with the axis of the legs, the side face is inclined to the end face and the ring is canted by a spring to clamp against the inner leg and prevent further axial movement thereof into the outer leg, while at the same time permitting extension of the inner leg out of the outer leg member.

4 Claims, 6 Drawing Figures

U.S. Patent Oct. 2, 1979 4,169,687
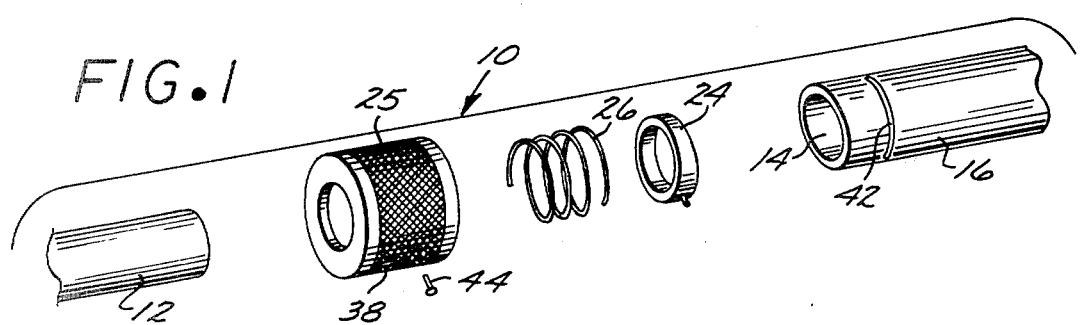
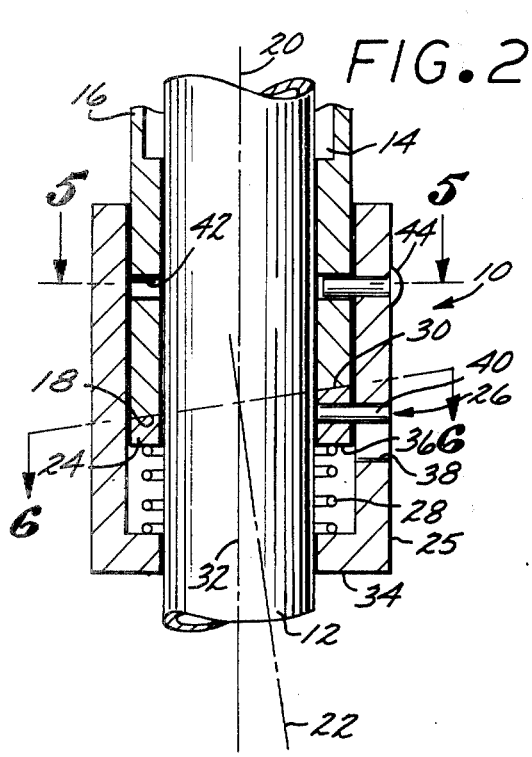
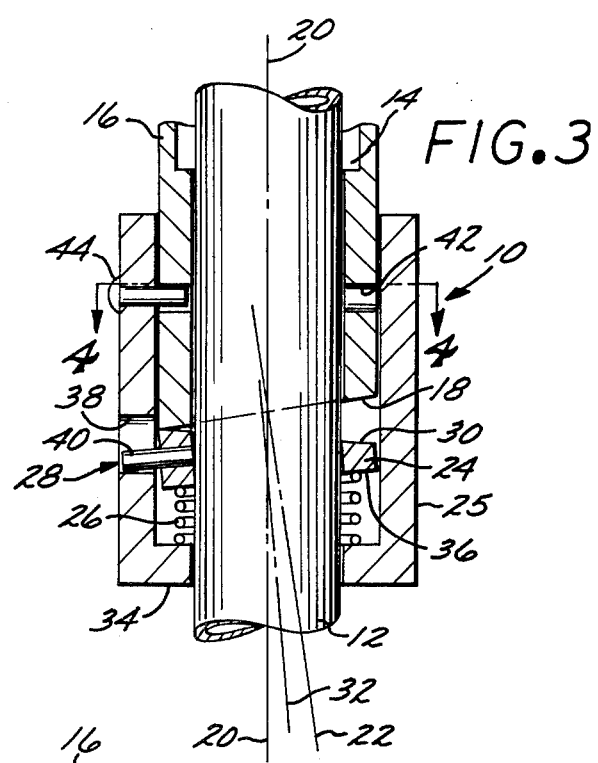
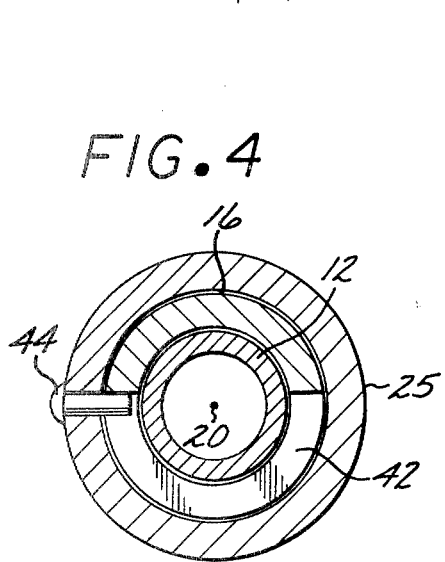
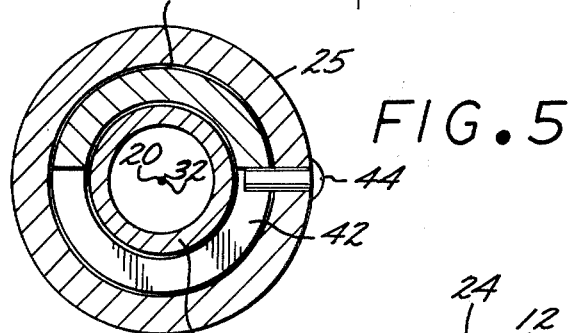

LOCK FOR EXTENDABLE LEG ASSEMBLY

BACKGROUND OF INVENTION

Extendable leg assemblies such as included in tripods and the like generally include an inner leg coaxial with and supported for telescoping movement within an end of an outer leg. A hand-operable lock mechanism is usually employed to prevent undesired telescoping movement between the inner and outer legs. One common form of such a lock comprises a collet built into the outer leg. By turning the collet in one direction it is tightened against the inner leg to prevent axial movement thereof. The heavier the load of the leg assembly, the tighter the collet must be to prevent axial movement between the legs. For any degree of collet tightness however, there is a critical load which will cause the inner leg to slip within the leg.

Another form of lock for an extendable leg assembly is disclosed in U.S. Pat. No. 3,480,247 issued Nov. 25, 1969, for "Self-locking Adjustable Stanchion." While the stanchion is self-locking, axial movement of a collet is required for release of the lock. Also, as disclosed, the lock is gravity sensitive in that vertical movement of the stanchion can cause accidental lock with falling movement of a lock ring within the lock assembly.

SUMMARY OF INVENTION

A lock for an extendable leg assembly including an inner leg coaxial with and supported for telescoping movement within an end of an outer leg. The lock comprises an end face of the outer leg around the inner leg and inclined relative to a longitudinal axis of the legs such that a line normal to the end face defines an acute angle with the longitudinal axis. A ring is supported for turning on the inner leg with an annular side facing the end face of the outer leg. The annular side of the ring also is inclined relative to the longitudinal axis of the legs such that in a first rotational position for the ring the side is parallel to and adapted to bear flush against the end face and a central axis for the ring is coaxial with the longitudinal axis. A hand-turnable sleeve axially receives the inner leg and surrounds the end of the outer leg and the ring member. A spring within the sleeve continuously bears on the ring in an axial direction toward the end fact to urge the annular side into flush engagement with the end face when the ring is in the first rotational position. Co-operative means between the sleeve and ring turn the ring with the sleeve between the first rotational position and a second rotational position where the annular side is inclined to the end face and the ring is pivoted by the spring to a canted position in the sleeve. In the canted position, the central axis of the ring forms an acute angle with the longitudinal axis of the legs and opposite radial inner annular edges of the ring engage the inner leg to lock the inner leg against axial movement into the outer leg. Thus, with the present invention, only a small torque is required on the sleeve to lock the telescoping legs against further inward movement and slippage does not occur since a greater load simply results in a greater locking.

BRIEF DESCRIPTION OF DRAWING

FIG. 1 is a perspective view of the components comprising the lock assembly separated for clarity.

FIG. 2 is an enlarged longitudinal cross-sectional view of the lock assembly in the first rotational position.

FIG. 3 is an enlarged longitudinal cross-sectional view of the lock assembly in the second rotational position.

FIG. 4 is a cross-sectional view along lines 4—4 in FIG. 3.

FIG. 5 is a cross-sectional view along lines 5—5 in FIG. 2.

FIG. 6 is a cross-sectional view along lines 6—6 in FIG. 2.

DESCRIPTION OF PREFERRED EMBODIMENT

The lock of the present invention is represented generally by the numeral 10 in combination with an inner tubular legs 12 coaxial with and supported for telescoping movement within an end 14 of an outer tubular leg 16.

An annular end face 18 of the outer leg 16 around the inner leg 12 is inclined relative to a longitudinal axis 20 of the inner and outer legs such a line 22 normal to the end face 18 defines an acute angle with the axis 20.

In addition to the end face 18 of the outer leg 16, the lock 10 includes a ring member 24, a sleeve 25, a spring 26, and co-operative means 28 between first and second rotational positions relative to the outer leg 16. More particularly, the ring 24 is characterized by an inner diameter slightly larger than the outer diameter of the inner leg. The ring is thus adapted to slide onto the inner leg and to turn thereon adjacent the end face 18 of the outer leg. In this regard, the ring includes a first annular side 30 facing the end face 18 and inclined relative to the longitudinal axis 20 such that in a first rotational position on the inner leg, the side 30 of ring 24 lies substantially parallel to and flush against the end face 18 with a central axis 32 of the ring coaxial with the axis 20.

Like the ring 24, the sleeve 25 also is dimensioned to axially receive the inner leg 12. It is also dimensioned to surround the end 14 of the outer leg 16. In these regards, the sleeve has an inner diameter slightly larger than the outer diameter of the outer leg 16 and ring 24. An annular collar 34 depends from an end of the sleeve and is dimensioned slightly larger than the outer diameter of the inner leg to axially receive the inner leg just beyond the end of the outer leg. In this manner the sleeve captures the ring 24 and the spring 26 around the inner leg 12 and between the end face 18 and the collar 34.

Preferably, the spring 26 is a coil spring around the inner leg 12 and compressed between a second annular side 36 of the ring 24 and the collar 34. The spring 26 thus functions to continuously bear on the ring in an axial direction toward the end face 18 of the outer leg 16 and to urge the first side of the ring into flush engagement with the end face when the ring is in its first rotational position. In the first rotational position, the inner leg is free to slide axially within and relative to the ring 24 and outer leg 16.

To turn the ring 24 to the second rotational position (see FIG. 3), where the inner leg 12 is fixedly locked against any axial movement into the outer leg 16, the form of the co-operative means illustrated in the drawing includes an axial slot 38 in the sleeve adjacent the end face 18 of the outer leg 16. A pin 40 extends radially from the ring 24 into the slot for longitudinal sliding movement therein as the sleeve is hand turned to simultaneously turn the ring 24. To define the first and second rotational positions and to limit relative turning of the sleeve between the two positions, the illustrated co-operative means 28 further includes a circumferentially extending arcuate groove 42 in the outer leg 16 and a pin 44 extending radially inward from the sleeve into the groove to ride therein upon a turning of the sleeve relative to the outer leg. The groove 42 is shown here in the interest of clarity, dimensioned to accommodate about 180° of turning of the sleeve relative to the legs. The exact angle is not critical and may be appreciably less, such as 90°. The ends of the groove are located such that the pin 44 engages one end when the ring is in the first rotational position shown in FIGS. 2, 5 and 6 with the side of ring 24 flush against the inclined end face 18 and the central axis aligned with the longitudinal axis of the legs. The pin 44 engages an opposite end of the groove 42 when the ring is turned about 180° to the second rotational position shown in FIGS. 3 and 4. In the second rotational position, the first side of the ring is inclined to the end face 18 and the ring is pivoted by the spring 26 to the canted position shown in FIG. 3. As illustrated, in the canted position, the central axis of the ring forms a small acute angle with the longitudinal axis of the legs and opposite radial inner annular edges of the ring engage and wedge against the inner leg to lock the inner leg against axial movement further into the outer leg.

Thus, to allow free telescoping movement of the inner leg relative to the outer leg, one simply turns the sleeve to the first rotational position (FIG. 2). To lock the legs, one simply turns the sleeve to the second rotational position (FIG. 3). In this manner, the present invention provides an improved manual lock for extendable leg assemblies which is neither gravity nor leg load sensitive.

While a particular form of lock assembly has been disclosed herein as a preferred embodiment, changes and modifications may be made therein without departing from the spirit of the invention, which is to be limited only by the term of the following claims.

I claim:

1. A lock for an extendable leg assembly including an inner leg member coaxial with and supported for telescoping movement within an end of an outer leg member, the lock comprising:
   an end face of said outer leg member around said inner leg member and inclined relative to a longitudinal axis of said inner and outer leg members such that a line normal to said end face defines an acute angle with said longitudinal axis;
   a ring member having an inner diameter greater than an outer diameter of said inner leg member and supported for turning thereon, said ring including a first annular side facing said end face and inclined relative to said longitudinal axis such that in a first rotational position with a central axis of said ring coaxial with said longitudinal axis said first side is substantially parallel to and adapted to bear flush against said end face;
   a turnable sleeve member axially receiving said inner leg member and surrounding said end of said outer leg member and said ring member;
   spring means within said sleeve and continuously bearing on said ring member in an axial direction toward said end face to urge said first side into flush engagement with said end face when said ring member is in said first rotational position; and
   co-operative means between said sleeve and ring members for turning said ring with said sleeve between said first rotational position and a second rotational position where said first side is inclined to said end face and said ring is pivoted by said spring means to a canted position in said sleeve with said central axis forming an acute angle with said longitudinal axis and opposite radial inner annular edges of said ring engaging said inner leg member to lock said inner leg member against axial movement into said outer leg member.

2. The lock of claim 1 wherein said co-operative means includes:
   an axial slot in one of said sleeve and ring members; and
   a pin extending from the other of said members into said slot for longitudinal sliding movement therein as said sleeve is turned to simultaneously turn said ring member.

3. The lock of claim 2 wherein said lock further includes means for limiting relative turning of said sleeve and ring between said first and second rotational positions including a circumferentially extending arcuate groove in one of said sleeve and outer leg members and a pin extending from the other of said sleeve and outer leg member to ride in said groove and engage ends thereof to define said first and second rotational positions with a turning of said sleeve.

4. The lock of claim 3 wherein said spring means comprises a coil spring around said inner leg and compressed between a second side of said ring member and an annular collar on an end of said sleeve.

* * * * *